United States Patent
Hirano et al.

(10) Patent No.: US 10,044,261 B2
(45) Date of Patent: Aug. 7, 2018

(54) POWER SUPPLY DEVICE

(71) Applicants: DENSO CORPORATION, Kariya, Aichi-pref. (JP); HONDA MOTOR CO., LTD., Minato-ku, Tokyo (JP)

(72) Inventors: Katsuyasu Hirano, Nagoya (JP); Toshihiro Nishimura, Handa (JP); Toshihiro Koike, Wako (JP)

(73) Assignees: DENSO CORPORATION, Kariya, Aichi-pref.; HONDA MOTOR CO., LTD., Tokyo (JP)

( * ) Notice: Subject to any disclaimer, the term of this patent is extended or adjusted under 35 U.S.C. 154(b) by 51 days.

(21) Appl. No.: 14/848,896

(22) Filed: Sep. 9, 2015

(65) Prior Publication Data
US 2016/0072379 A1 Mar. 10, 2016

(30) Foreign Application Priority Data
Sep. 10, 2014 (JP) .................... 2014-184139

(51) Int. Cl.
*H02M 3/156* (2006.01)
*H02M 1/32* (2007.01)

(52) U.S. Cl.
CPC ............. *H02M 3/156* (2013.01); *H02M 1/32* (2013.01)

(58) Field of Classification Search
CPC ................. H02M 3/156; H02M 1/32; H02M 2001/0032; H02M 2001/0022; H02M 3/33507; H02J 3/385
See application file for complete search history.

(56) References Cited

U.S. PATENT DOCUMENTS

| | | | | |
|---|---|---|---|---|
| 2004/0090218 | A1* | 5/2004 | Isham | H02M 3/1588 323/282 |
| 2008/0247199 | A1* | 10/2008 | Djenguerian | H02M 1/32 363/50 |
| 2012/0026771 | A1* | 2/2012 | Imura | B60L 3/0015 363/178 |

(Continued)

FOREIGN PATENT DOCUMENTS

| | | |
|---|---|---|
| JP | 2005-231411 A | 9/2005 |
| JP | 2010-057244 A | 8/2008 |

(Continued)

*Primary Examiner* — Adolf Berhane
*Assistant Examiner* — Henry Lee, III
(74) *Attorney, Agent, or Firm* — Knobbe, Martens, Olson & Bear, LLP

(57) ABSTRACT

A DC power supply circuit outputs an output voltage, which varies with an input voltage. The output voltage therefore occasionally deviates from a normal output voltage range although the DC power supply circuit is normal. However, the DC power supply circuit converts the input voltage in a predetermined relation between the input voltage and the output voltage. When the output voltage of the DC power supply circuit deviates from a predetermined normal output voltage range, a determination circuit determines that the DC power supply circuit is abnormal when the input voltage and the output voltage of the DC power supply circuit are not in the predetermined relation. It is thus prevented that the DC power supply circuit is erroneously determined to be abnormal although operating normally. As a result, it is possible to eliminate erroneous determination in determining the operation state itself.

11 Claims, 2 Drawing Sheets

(56) References Cited

U.S. PATENT DOCUMENTS

| | | | |
|---|---|---|---|
| 2012/0205974 A1* | 8/2012 | McCaslin | H02J 3/385 307/18 |
| 2013/0169191 A1 | 7/2013 | Ootsuka et al. | |
| 2014/0167661 A1* | 6/2014 | van der Merwe | H02M 3/33507 318/400.3 |
| 2014/0293658 A1* | 10/2014 | Cao | H02M 3/33576 363/21.02 |

FOREIGN PATENT DOCUMENTS

| | | |
|---|---|---|
| JP | 2011-024294 A | 7/2009 |
| JP | 2012-127810 A | 7/2012 |
| WO | WO 2012/095889 A1 | 7/2012 |

* cited by examiner

POWER SUPPLY DEVICE

CROSS REFERENCE TO RELATED APPLICATION

This application is based on Japanese patent application No. 2014-184139 filed on Sep. 10, 2014, the contents of which are incorporated herein by reference.

FIELD

The present disclosure relates to a power supply device, which is capable of determining an operation state thereof.

BACKGROUND

As a conventional device having a power supply device, a passenger detection electronic control unit (ECU) is disclosed in, for example, JP 2005-231411 A.

This passenger detection ECU is mounted on a vehicle to determine states of a passenger in a vehicle based on a detection result of a load sensor provided on a seat in a vehicle compartment. The passenger detection ECU includes a central processing unit (CPU) and a 5V-power supply circuit. The 5V-power supply circuit converts a voltage supplied from a vehicle battery to 5V and supplies it to the load sensor and the CPU. The CPU determines the state of the passenger in the vehicle based on the detection result of the load sensor. When the 5V-power supply circuit is in an abnormal state, the load sensor and the CPU do not operate normally. For this reason, the CPU monitors an output voltage of the 5V-power supply circuit and determines an operation state of the 5V-power supply circuit based on a monitored output voltage. For example, when the output voltage of the 5V-power supply circuit is in a normal output voltage range, the CPU determines that the 5V-power supply circuit is normal. When the output voltage of the 5V-power supply circuit is in a range other than the normal output voltage range, the CPU determines that the 5V-power supply circuit is abnormal.

The output voltage of the vehicle battery varies with a charge state and a load state. In a case that the 5V-power supply circuit is a regulated power supply circuit, the output voltage of the power supply circuit is maintained at a constant voltage even when the input voltage supplied from the vehicle battery varies. For this reason, as far as the 5V-power supply circuit is normal, its output voltage is maintained within the normal output voltage range and is not determined to be abnormal. In a case that the 5V-power supply circuit is not the regulated power supply circuit, the output voltage of the power supply circuit varies with a variation of the input voltage supplied from the vehicle battery. As a result, although the 5V-power supply circuit is normal, its output voltage is likely to vary to be outside the normal output voltage range and be determined erroneously to be abnormal.

SUMMARY

It is therefore an object to provide a power supply device, which is capable of reducing an erroneous determination in determining its own operation state.

According to one aspect, a power supply device comprises a DC power supply circuit and a determination circuit. The DC power supply circuit converts an input voltage to an output voltage and outputs the output voltage varying with the input voltage. The determination circuit is connected to the DC power supply circuit and determines that the DC power supply circuit is normal when the output voltage of the DC power supply circuit is in a predetermined normal output voltage range. The determination circuit further determines that the DC power supply circuit is abnormal when the output voltage of the DC power supply circuit is in a range outside the predetermined normal output voltage range and the output voltage is in a predetermined relation relative to the input voltage.

For example, the DC power supply circuit outputs the output voltage by multiplication of the input voltage with a predetermined coefficient. The determination circuit determines that the DC power supply circuit is abnormal when the output voltage of the DC power supply circuit is in the range outside the normal output voltage range and, as the predetermined relation, a differential voltage, which is calculated by subtracting the input voltage from the output voltage, is in a range outside a predetermined normal differential voltage range.

DETAILED DESCRIPTION OF EMBODIMENT

A power supply device according to embodiments will be described with reference to accompanying drawings.

Figure 1:
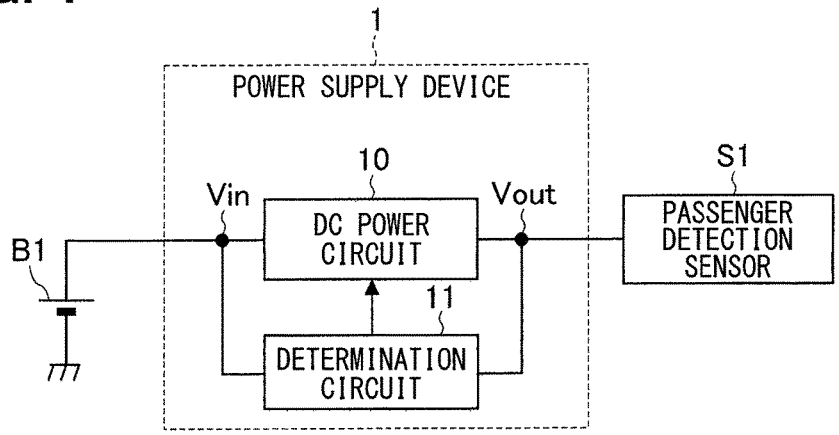
FIG. 1 is a block diagram of a power supply device according to one embodiment.

As shown in FIG. 1, a power supply device 1, which is mounted in a vehicle, is configured to convert an input voltage Vin supplied from a vehicle battery B1 and supply a converted voltage as an output voltage Vout thereof to a passenger detection sensor S1. The vehicle battery B1 is a DC power supply source, which supplies its DC voltage to various electronic devices mounted in the vehicle. A positive terminal of the vehicle battery B1 is connected to the power supply device 1 and a negative terminal of the same is grounded. The passenger detection sensor S1 is configured to detect a passenger in the vehicle. Specifically, the passenger detection sensor S1 is a load sensor. The passenger detection sensor S1 is provided in a seat in a vehicle compartment and connected to the power supply device 1. The power supply device 1 includes a DC power supply circuit 10 and a determination circuit 11.

The DC power supply circuit 10 is configured to convert the input voltage Vin supplied from the vehicle battery B1 and supply the converted voltage as the output voltage Vout to the passenger detection sensor S1. The DC power supply circuit 10 is configured to convert the input voltage Vin and to the output voltage Vout in a predetermined input-output conversion relation so that the output voltage Vout varies when the input voltage Vin varies. Specifically, the output voltage Vout decreases and increases proportionally as the input voltage Vin decreases and increases, respectively. More specifically, the DC power supply circuit 10 converts the input voltage Vin to the output voltage Vout with a predetermined coefficient K (K>0), which is a voltage conversion ratio. As far as the DC power supply circuit converts the input voltage normally, a differential voltage (voltage difference) $\Delta V$ between the input voltage Vin and the output voltage, which is a product of the output voltage Vout and the predetermined coefficient K, is within a predetermined normal differential voltage range, which is from $\Delta$Vmin to $\Delta$Vmax and indicates a normal state. Here, $\Delta$Vmin is a lower limit threshold value (negative value) of the differential voltage range and is not included in the normal differential voltage range. $\Delta$Vmax is a higher limit threshold value (positive value) of the differential voltage range and is not included in the normal differential voltage range. The DC power supply circuit 10 is configured to be reactivated by the determination circuit 11 when necessary.

An input terminal and an output terminal of the DC power supply circuit 10 is connected to the positive terminal of the vehicle battery B1 and the passenger detection sensor S1, respectively. A control terminal of the DC power supply circuit 10 is connected the determination circuit 11.

The determination circuit 11 is configured to determine whether the DC power supply circuit 10 is normal or abnormal based on the input voltage Vin and the output voltage Vout of the DC power supply circuit 10 and further whether the DC power supply circuit 10 is failing. The determination circuit 11 is configured also to reactivate the DC power supply circuit 10 based on a determination result so that the DC power supply circuit 10 restores its operation. The determination circuit 11 may be a programmed microcomputer including a CPU and a memory. The CPU executes various processing in accordance with programs stored in the memory.

Figure 3:
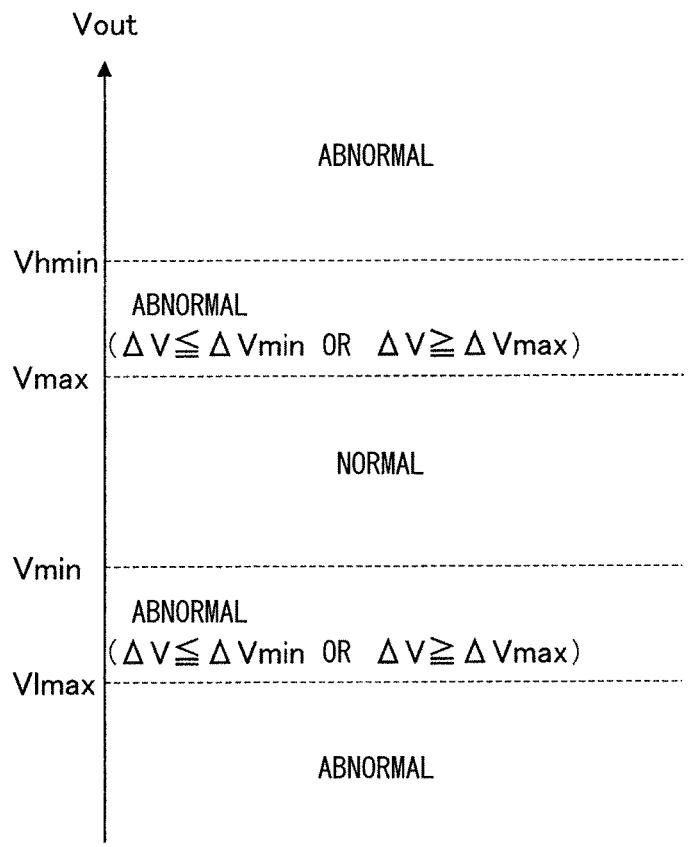
FIG. 3 is an explanatory diagram showing normal and abnormal ranges of an output voltage of the determination circuit shown in FIG. 1.

As exemplified in FIG. 3, the determination circuit 11 determines that the DC power supply circuit 10 is normal, when the output voltage Vout of the DC power supply circuit 10 is within a normal output voltage range, which is Vmin to Vmax. The normal output voltage range (Vmin to Vmax) is set to be a range of a voltage, which the DC power supply circuit 10 is capable of outputting when it is normal. Vmin is a lower limit threshold value of the normal output voltage range and is not included in the normal output voltage range. Vmax is a higher limit threshold value of the normal output voltage range and is not included in the normal output voltage range.

The determination circuit 11 determines that the DC power supply circuit 10 is abnormal when the output voltage Vout of the DC power supply circuit 10 is outside the normal output voltage range (Vmin to Vmax) and the input voltage Vin and the output voltage Vout of the DC power supply circuit 10 are in a predetermined abnormality relation, which is different from the predetermined relation described above. Specifically, the determination circuit 11 determines that the DC power supply circuit 10 is abnormal when the output voltage Vout of the DC power supply circuit 10 is outside the normal output voltage range (Vmin to Vmax) and, as the predetermined abnormality relation, the differential voltage $\Delta V$ is outside the differential voltage range ($\Delta$Vmin to $\Delta$Vmax). This differential voltage is referred to in determining whether the DC power supply circuit 10 is normal or abnormal, because an A/D converter (not shown) provided for converting the detected output voltage Vout into a corresponding digital value may operate erroneously even when the output voltage Vout itself is normal.

The determination circuit 11 further determines that the DC power supply circuit 10 is abnormal when the output voltage Vout of the DC power supply circuit 10 is in one of low-side and high-side abnormal output voltage ranges, which are set in a lower voltage side range and a higher voltage side range relative to the normal output voltage range (Vmin to Vmax), respectively. The low-side abnormal output voltage range, which is lower than a low-side limit threshold value (maximum value) Vlmax, is set to be a voltage range, which is at a lower voltage side than the normal output voltage range (Vmin to Vmax) and is not outputted when the DC power supply circuit 10 is normal. The high-side abnormal output voltage range, which is higher than a high-side limit threshold value (minimum value) Vhmin, is set to be a voltage range, which is at a higher voltage side than the normal output voltage range (Vmin to Vmax) and is not outputted when the DC power supply circuit 10 is normal. The low-side limit threshold value Vlmax of the low-side abnormal output voltage range at the lower voltage side is included in the low-side abnormal output voltage range. The high-side limit threshold value Vhmin of the high-side abnormal output voltage range at the higher voltage side is included in the high-side abnormal output voltage range.

The determination circuit 11 reactivates the DC power supply circuit 10 upon determination that the DC power supply circuit 10 is abnormal. The determination circuit 11 determines that the DC power supply circuit 10 is in failure when the DC power supply circuit 10 is determined to be abnormal a predetermined number of times in succession, for example, for a predetermined time period. Specifically, the determination circuit 11 determines that the DC power supply circuit 10 is in failure when the number of times of successive reactivations reaches a predetermined reactivation threshold value N. The reactivation threshold value N is set to exclude a temporary abnormality of the DC power supply circuit 10.

The determination circuit 11 is connected to the input terminal and the output terminal of the DC power supply circuit 10. The determination circuit 11 is connected further to the control terminal of the DC power supply circuit 10.

An operation of the power supply device according to the embodiment will be described next with particular reference to FIG. 2 to FIG. 4.

Figure 2:
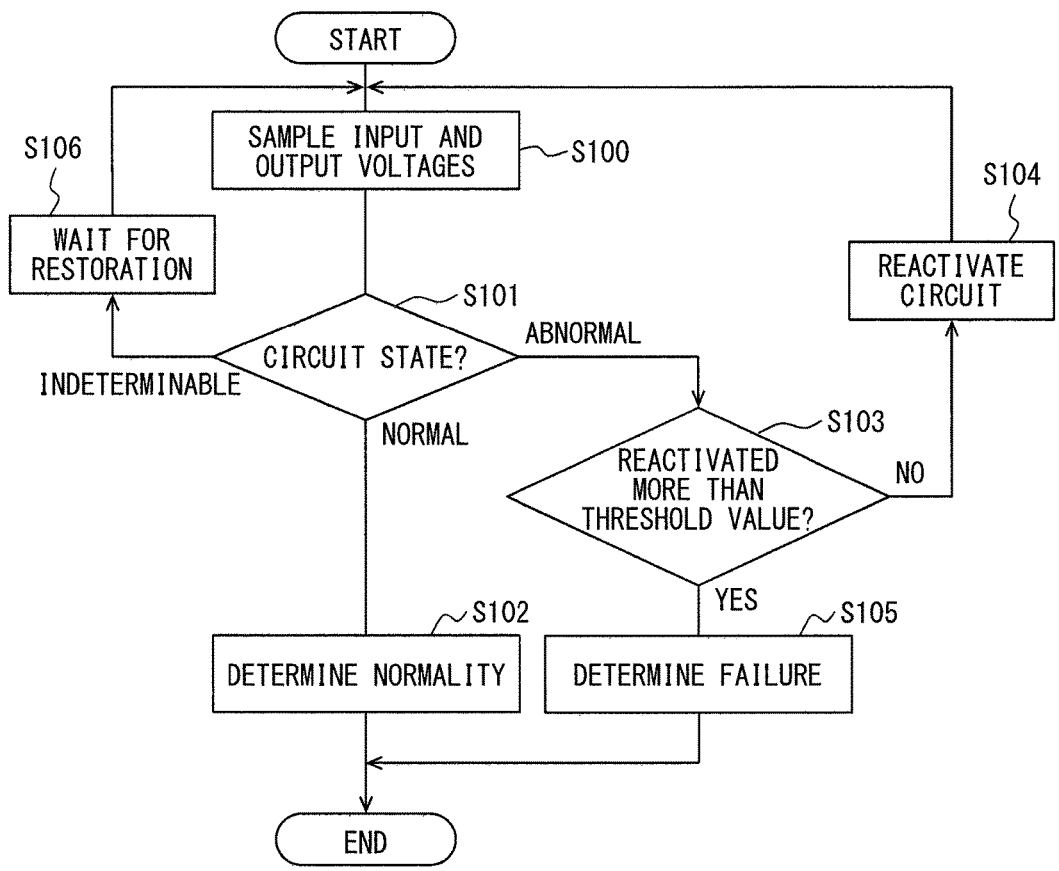
FIG. 2 is a flowchart showing an operation of a determination circuit of the power supply device shown in FIG. 1.

As shown in FIG. 2, the determination circuit 11 samples at step S100 the input voltage Vin and the output voltage Vout of the DC power supply circuit 10. The determination circuit 11 determines at step S101 the state of the DC power supply circuit 10 based on the sampled input and output voltages Vin and Vout of the DC power supply circuit 10 and the determination logic shown in FIG. 3, FIG. 4A and FIG. 4B.

Figure 4A:
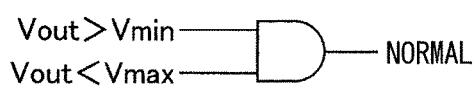
FIG. 4A and FIG. 4B are logic circuit diagrams showing determination logic of normality and abnormality of the power supply device shown in FIG. 1, respectively.

The determination circuit 11 determines that the DC power supply circuit 10 is normal when the output voltage Vout of the DC power supply circuit 10 is within the normal output voltage range (Vmin to Vmax) shown in FIG. 3. Specifically, the determination circuit 11 determines that the DC power supply circuit 10 is normal when the output voltage Vout of the DC power supply circuit 10 is higher than the lower limit threshold value Vmin of the normal output voltage and lower than the higher limit threshold value Vmax. This determination logic circuit is shown in FIG. 4A.

The determination circuit 11 determines that the DC power supply circuit 10 is abnormal when the output voltage Vout of the DC power supply circuit 10 is in the range, which is outside the normal output voltage range (Vmin to Vmax), and the output voltage Vout is in the predetermined abnormality relation relative to the input voltage Vin. The predetermined abnormality relation is defined to indicate a case that the differential voltage $\Delta V$ of the DC power supply circuit 10 is in the range, which is outside the differential voltage range ($\Delta$Vmin to $\Delta$Vmax), as shown in FIG. 3.

Figure 4B:
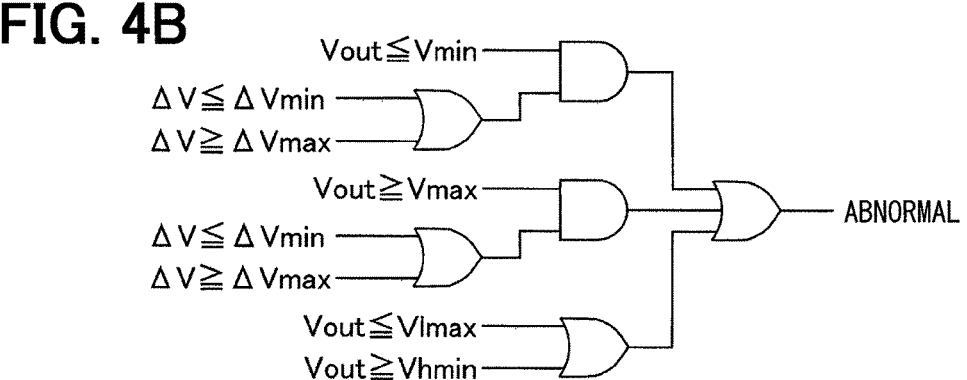

Specifically, the determination circuit 11 determines that the DC power supply circuit 10 is abnormal when the output voltage Vout of the DC power supply circuit 10 is lower than the lower limit threshold value Vmin of the normal output voltage and the differential voltage ΔV is lower than the lower limit threshold value ΔVmin of the differential voltage range or higher than the higher limit threshold value ΔVmax of the differential voltage range. Further, the determination circuit 11 determines that the DC power supply circuit 10 is abnormal when the output voltage Vout of the DC power supply circuit 10 is higher than the higher limit threshold value Vmax of the normal output voltage and the differential voltage ΔV is lower than the lower limit threshold value ΔVmin of the differential voltage range or higher than the higher limit threshold value ΔVmax of the differential voltage range. This determination logic circuit is shown in FIG. 4B.

In addition, the determination circuit 11 determines that the DC power supply circuit 10 is abnormal when the output voltage Vout of the DC power supply circuit 10 is in one of the abnormal output voltage ranges defined by threshold values Vlmax and Vhmin, which are set at the lower voltage side and the higher voltage side than the normal output voltage range (Vmin to Vmax) as shown in FIG. 3. Specifically, the determination circuit 11 determines that the DC power supply circuit 10 is abnormal when the output voltage of the DC power supply circuit 10 is equal to or lower than the low-side higher limit threshold value Vlmax of the abnormal output voltage range of the lower voltage side or equal to or higher than the high-side lower limit threshold value Vhmin of the abnormal output voltage range of the higher voltage side. This logic circuit is also shown in FIG. 4B.

The determination circuit 11 determines at step S101 that the DC power supply circuit 10 is indeterminable when the output voltage Vout of the DC power supply circuit 10 is not in the states described above.

The determination circuit 11 finally determines at step S102 that the DC power supply circuit 10 is normal when the DC power supply circuit 10 is determined to be normal at step S101.

On the other hand, when the determination circuit 11 determines that the DC power supply circuit 10 is abnormal at step S101, the determination circuit 11 further determines at step S103 whether the number of continued reactivation of the DC power supply circuit 10 reached the reactivation threshold value N.

When the determination circuit 11 determines at step S103 that the number of successive reactivations of the DC power supply circuit 10 does not reach the reactivation threshold value N (NO), the determination circuit 11 reactivates the DC power supply circuit 10 at step S104. The determination circuit 11 reactivates the DC power supply circuit 10 in response to every determination of abnormality of the DC power supply circuit 10 until the number of reactivation reaches the reactivation threshold value N. The determination circuit 11 then executes step S100 again following step S104.

When the determination circuit 11 determines at step S103 that the number of successive reactivations of the DC power supply circuit 10 reached the reactivation threshold value N (YES), the determination circuit 11 finally determines at step S105 that the DC power supply circuit 10 is failing. That is, the DC power supply circuit 10 is determined to be in failure, when the DC power supply circuit 10 is determined to be abnormal the predetermined number of times, that is, the reactivation threshold value (for example, 10) in succession.

When the determination circuit 11 determines at step S101 that the DC power supply circuit 10 is in the indeterminable state, the determination circuit 11 waits at step S106 the DC power supply circuit 10 to restore its normal state for a predetermined period. The determination circuit 11 then executes step S100 again.

The power supply device 1 according to the embodiment provides the following advantages.

According to the embodiment, the DC power supply circuit 10 varies its output voltage Vout proportionally in correspondence to the input voltage Vin. For this reason, the output voltage Vout may occasionally deviates from the normal output voltage range (Vmin to Vmax) even when the DC power supply circuit 10 is normal. However, the DC power supply circuit 10 has the predetermined conversion relation between the input voltage Vin and the output voltage Vout. When the output voltage Vout of the DC power supply circuit 10 is in the range, which excludes the normal output voltage range (Vmin to Vmax), the determination circuit 11 determines that the DC power supply circuit 10 is abnormal in the case that the input voltage Vin and the output voltage Vout of the DC power supply circuit 10 are not in the predetermined conversion relation. The DC power supply circuit 10 is therefore not determined to be abnormal although operating normally. It is thus possible to prevent an erroneous determination in its determination of the operation states.

According to the embodiment, the DC power supply circuit 10 decreases the output voltage Vout in correspondence to a decrease in the input voltage Vin and increases the output voltage Vout in correspondence to an increase in the input voltage Vin with the predetermined coefficient of conversion. For this reason, the output voltage Vout may occasionally deviate from the normal output voltage range (Vmin to Vmax) even when the DC power supply circuit 10 is normal. It is also possible even in this case to prevent an erroneous determination in its determination of the operation states.

According to the embodiment, the DC power supply circuit 10 converts the input voltage Vin to the output voltage Vout with the predetermined coefficient K. The differential voltage ΔV calculated by subtracting the input voltage Vin from the voltage, which is calculated by multiplying the output voltage Vout and the predetermined coefficient K, is normally within the predetermined normal differential voltage range (ΔVmin to ΔVmax). When the output voltage Vout of the DC power supply circuit 10 is in the range, which excludes the normal output voltage range (Vmin to Vmax), the determination circuit 11 determines that the DC power supply circuit 10 is abnormal in the case that the output voltage Vout is in the predetermined abnormality relation relative to the input voltage, that is, the differential voltage ΔV is not in the differential voltage range (ΔVmin to ΔVmax). For this reason, it is possible to prevent an erroneous determination that the DC power supply circuit 10 is abnormal although operating normally. It is thus possible to prevent surely an erroneous determination in its determination of the operation states.

When the output voltage Vout of the DC power supply circuit 10 is in the range, which is in one of the abnormal output voltage ranges lower than Vlmax and higher than Vhmin, which are set at the lower voltage side and the higher voltage side than the normal output voltage range (Vmin to Vmax), the determination circuit 11 determines that the DC power supply circuit 10 is abnormal whether the differential voltage ΔV is in the normal differential voltage range (ΔVmin to ΔVmax) or not. Here, the abnormal output voltage ranges, which are lower than Vlmax and higher than Vhmin, are set to correspond to the ranges of voltages, which are not outputted when the DC power supply circuit 10 is normal. Thus it is possible to determine clear abnormality of the DC power supply circuit 10.

According to the embodiment, the determination circuit 11 reactivates the DC power supply circuit 10 upon determination that the DC power supply circuit 10 is abnormal. For this reason, when the abnormality of the DC power supply circuit 10 is only temporary, the DC power supply circuit 10 can be restored. As a result, it is possible to prevent that the voltage supply to the passenger detection sensor S1 is stopped frequently.

According to the embodiment, the determination circuit 11 determines that the DC power supply circuit 10 is failing when the DC power supply circuit 10 is determined to be abnormal the predetermined number of times (threshold value N) in succession. For this reason, it is possible to surely determine that the DC power supply circuit 10 is not in the state of temporary abnormality but is in the failure state.

According to the embodiment, the power supply device 1 supplies the output voltage Vout to the passenger detection sensor S1, which is provided to detect a passenger in the vehicle. It is therefore possible to eliminate an erroneous determination in determining an operation state of the power supply device, which forms a part of a passenger detection system.

In the embodiment, the DC power supply circuit 10 is exemplified to have the predetermined conversion relation, by which the differential voltage ΔV determined by the input voltage Vin, the output voltage Vout and the predetermined coefficient K remains in the predetermined normal differential voltage range (ΔVmin to ΔVmax). However, the relation between the input voltage Vin and the output voltage Vout may be different from the above-exemplified relation. It suffices that the DC power supply circuit 10 converts the input voltage Vin to the output voltage Vout in an specified input-output conversion relation and the determination circuit 11 determines the state of the DC power supply circuit 10 in correspondence to the specified input-output conversion relation.

What is claimed is:

1. A power supply device comprising:
a DC power supply circuit for converting an input voltage to an output voltage and outputting the output voltage varying with the input voltage; and
a determination circuit connected to the DC power supply circuit for determining that the DC power supply circuit is normal when the output voltage of the DC power supply circuit is in a predetermined normal output voltage range,
wherein the determination circuit further determines that the DC power supply circuit is abnormal when the output voltage of the DC power supply circuit is in a range outside the predetermined normal output voltage range and the output voltage is in a predetermined abnormality relation relative to the input voltage,
wherein the DC power supply circuit decreases and increases the output voltage with a decrease and an increase in the input voltage, respectively,
wherein the DC power supply circuit outputs the output voltage by multiplication of the input voltage with a predetermined coefficient, and
wherein the determination circuit determines that the DC power supply circuit is abnormal when the output voltage of the DC power supply circuit is in the range outside the normal output voltage range and, as the predetermined abnormality relation, a differential voltage, which is calculated by subtracting the input voltage from the output voltage, is in a range outside a predetermined normal differential voltage range.

2. A power supply device comprising:
a DC power supply circuit for converting an input voltage to an output voltage and outputting the output voltage varying with the input voltage; and
a determination circuit connected to the DC power supply circuit for determining that the DC power supply circuit is normal when the output voltage of the DC power supply circuit is in a predetermined normal output voltage range,
wherein the determination circuit further determines that the DC power supply circuit is abnormal when the output voltage of the DC power supply circuit is in a range outside the predetermined normal output voltage range and the output voltage is in a predetermined abnormality relation relative to the input voltage,
wherein the determination circuit determines that the DC power supply circuit is abnormal when the output voltage of the DC power supply circuit is in predetermined abnormal output voltage ranges, which are set at a lower voltage side and a higher voltage side than the predetermined normal output voltage range,
wherein the predetermined normal output range is set to be higher than a predetermined lower limit threshold value and lower than a predetermined higher limit threshold value, and
wherein the lower voltage side is set to be lower than a predetermined low-side limit threshold value, which is lower than the predetermined lower limit threshold value of the normal output range, and the higher voltage side is set to be higher than a predetermined high-side limit threshold value, which is higher than the predetermined higher limit threshold value of the normal output range.

3. The power supply device according to claim 2, wherein the determination circuit reactivates the DC power supply circuit upon determination that the DC power supply circuit is abnormal.

4. The power supply device according to claim 2, wherein the determination circuit determines that the DC power supply circuit is failing upon a predetermined number of determinations in succession that the DC power supply circuit is abnormal.

5. The power supply device according to claim 1, wherein:
the DC power supply circuit is mounted in a vehicle and connected to a passenger detection sensor, which is provided to detect a passenger.

6. A power supply device comprising:
a DC power supply circuit for converting an input voltage to an output voltage and outputting the output voltage varying with the input voltage; and
a determination circuit connected to the DC power supply circuit for determining that the DC power supply circuit is normal when the output voltage of the DC power supply circuit is in a predetermined normal output voltage range,
wherein the determination circuit further determines that the DC power supply circuit is abnormal when the output voltage of the DC power supply circuit is in a range outside the predetermined normal output voltage range and the output voltage is in a predetermined abnormality relation relative to the input voltage, wherein the DC power supply circuit decreases and increases the output voltage with a decrease and an increase in the input voltage, respectively, wherein the DC power supply circuit converts the input voltage to the output voltage with a predetermined conversion coefficient, and wherein the determination circuit determines that the DC power supply circuit is abnormal when the output voltage of the DC power supply circuit is in the range outside the normal output voltage range and, as the predetermined abnormality relation, a differential voltage, which is calculated by subtracting the input voltage from the output voltage, is in a range outside a predetermined normal differential voltage range.

7. The power supply device according to claim 6, wherein:

the determination circuit determines that the DC power supply circuit is abnormal when the output voltage of the DC power supply circuit is in predetermined abnormal output voltage ranges, which are set at a lower voltage side and a higher voltage side than the predetermined normal output voltage range.

8. The power supply device according to claim 1, wherein:

the predetermined normal output voltage range is invariable with the input voltage and the predetermined abnormality relation is variable with the input voltage.

9. The power supply device according to claim 1, wherein:

the DC power supply circuit is an unregulated power supply circuit, which maintains the output voltage at a constant voltage relative to a variation in the input voltage.

10. The power supply device according to claim 2, wherein the DC power supply circuit decreases and increases the output voltage with a decrease and an increase in the input voltage, respectively.

11. The power supply device according to claim 2, wherein the determination circuit checks whether the output voltage is in the predetermined abnormality relation relative to the input voltage in a range between the predetermined low-side limit threshold value and the predetermined lower limit threshold value and in a range between the predetermined high-side limit threshold value and the predetermined higher limit threshold value.

* * * * *

UNITED STATES PATENT AND TRADEMARK OFFICE
CERTIFICATE OF CORRECTION

PATENT NO. : 10,044,261 B2
APPLICATION NO. : 14/848896
DATED : August 7, 2018
INVENTOR(S) : Katsuyasu Hirano et al.

It is certified that error appears in the above-identified patent and that said Letters Patent is hereby corrected as shown below:

On the Title Page

Item (73) Assignee, Line 2, change "Aichi-pref.;" to --Aichi-pref. (JP);--

Signed and Sealed this
Thirteenth Day of November, 2018

Andrei Iancu
*Director of the United States Patent and Trademark Office*